(12) United States Patent
Kim

(10) Patent No.: US 6,373,516 B1
(45) Date of Patent: Apr. 16, 2002

(54) PICTURE POSITION INDICATOR FOR PICTURE PHONE

(75) Inventor: Seung Kil Kim, Chapel Hill, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/439,386

(22) Filed: Nov. 15, 1999

(51) Int. Cl.$^7$ .................................................. H04N 7/14
(52) U.S. Cl. ............................... 348/14.01; 348/14.07; 348/14.16
(58) Field of Search ........................... 348/14.01, 14.02, 348/14.03, 14.05, 169, 352, 345, 333.03, 152, 154, 155, 156, 14.07, 14.08, 14.09, 14.16; 382/103, 106, 291; 345/330, 329, 340, 435

(56) References Cited

U.S. PATENT DOCUMENTS

| 5,754,225 A | 5/1998 | Naganuma |
| 5,778,099 A | 7/1998 | Suzuki |
| 5,786,846 A * | 7/1998 | Hiroaki ........................ 348/20 |
| 5,903,783 A | 5/1999 | Kanabayashi et al. |

FOREIGN PATENT DOCUMENTS

| JP | 405068241 A * | 3/1993 | ............ H04N/7/14 |

* cited by examiner

*Primary Examiner*—Huyen Le
*Assistant Examiner*—Melur Ramakrishnaiah
(74) *Attorney, Agent, or Firm*—Wood, Phillips, Van Santen, Clark & Mortimer

(57) ABSTRACT

A communication including a camera adapted to capture a picture, a transceiver adapted to receive a picture from a remote device and to transmit the picture captured by the camera, a processor adapted to recognize an object in the local picture and generate a position indicator of the object, and a video display adapted to display both the received remote picture and the position indicator, the position indicator being displayed on the video display to indicate the location of the local picture object. The captured picture has a boundary about its object, and the position indicator is a frame for the captured picture corresponding to the boundary. The video display displays the captured picture frame in a position corresponding to the location of the object with the video display.

10 Claims, 3 Drawing Sheets

PICTURE POSITION INDICATOR FOR PICTURE PHONE

BACKGROUND OF THE INVENTION

1. Technical Field

The present invention is directed toward telephones, and more particularly toward two way picture phones.

2. Background Art

Communication devices have typically included audio communications and, occasionally, video communications as well. For example, picture phones have been available for quite some time, and commonly used in video conferencing. In such applications, a reasonably large video screen or display (greater than 4 inches) is available, with the received (remote) picture displayed on the screen and the picture being transmitted shown in a small corner of the display. In such applications, the camera is generally fixed, so that the user can calibrate the picture (that is, properly aim the camera) by viewing what the camera is capturing on his own display and then adjusting the camera position and settings until his own display shows that the camera is capturing what is sought to be captured. In that case, the user can change his own display to view only the received picture in an two way communication (turning off the portion of his display which shows what his own camera is capturing) and still feel assured that his camera is capturing what he intends to transmit to the other party as the communication progresses.

Particularly when such communications are used with portable devices, however, such operation is either impossible or inadequate. That is, such devices are typically required to have much smaller displays (e.g., an LCD screen most likely less than 2 inches diagonally) due to the small size of the device itself. Such a small screen size makes it impractical to display the picture being transmitted in a corner, as it will be either very small or will unacceptably block too much of the received picture. Further, since such devices are typically hand held and the user is frequently moving, the device is also constantly moving as is the camera included therein, making it difficult to continually ensure that the picture being captured is what the person wants to have captured. Of course, this then makes it particularly important that the person using the device have some way to tell that, especially since the user's focus will be on the received picture and may lose track of the fact that he is also transmitting a picture.

The present invention is directed toward overcoming one or more of the problems set forth above.

SUMMARY OF THE INVENTION

In one aspect of the present invention, a communication device is provided, including a camera adapted to capture a picture, a transceiver adapted to receive a picture from a remote device and to transmit the picture captured by the camera, a processor adapted to recognize an object in the local picture and generate a position indicator of the object, and a video display adapted to display both the received remote picture and the position indicator, the position indicator being displayed on the video display to indicate the location of the local picture object.

In a preferred form of this aspect of the invention, the captured picture has a boundary about its object, and the position indicator is a frame for the captured picture corresponding to the boundary, where the video display displays the captured picture frame in a position corresponding to the location of the object with the video display. In a further preferred form the object is the person using the communication device.

In another preferred form of this aspect of the invention, the captured picture object is recognized by motion of the object in the captured picture. In still another preferred form, the captured picture object has a known contour and the processor is adapted to recognize the object by recognizing that known contour.

In still another preferred form, the device is a telephone, particularly a cellular telephone.

In another aspect of the present invention, a method of indicating the proper orientation of a local camera in a two way video communication involving a received remote picture and a transmitted local picture is provided, including the steps of (1) displaying the remote picture on a local video display, (2) recognizing an object in the local camera picture, and (3) displaying a position indicator on the video display corresponding to the position of the object within the boundary of the local picture.

In a preferred form of this aspect of the invention, the displaying steps occur continuously with the remote picture and the position indicator displayed on the local video display simultaneously.

In another preferred form, the remote picture is shown on substantially the entirety of the video display and the position indicator is oriented based on generally corresponding boundaries of the remote and local pictures.

It is an object of the invention to provide a video communication device which may be reliably and easily used to adequately view received pictures and to transmit adequate pictures as well.

DESCRIPTION OF THE PREFERRED EMBODIMENT

Figure 1:
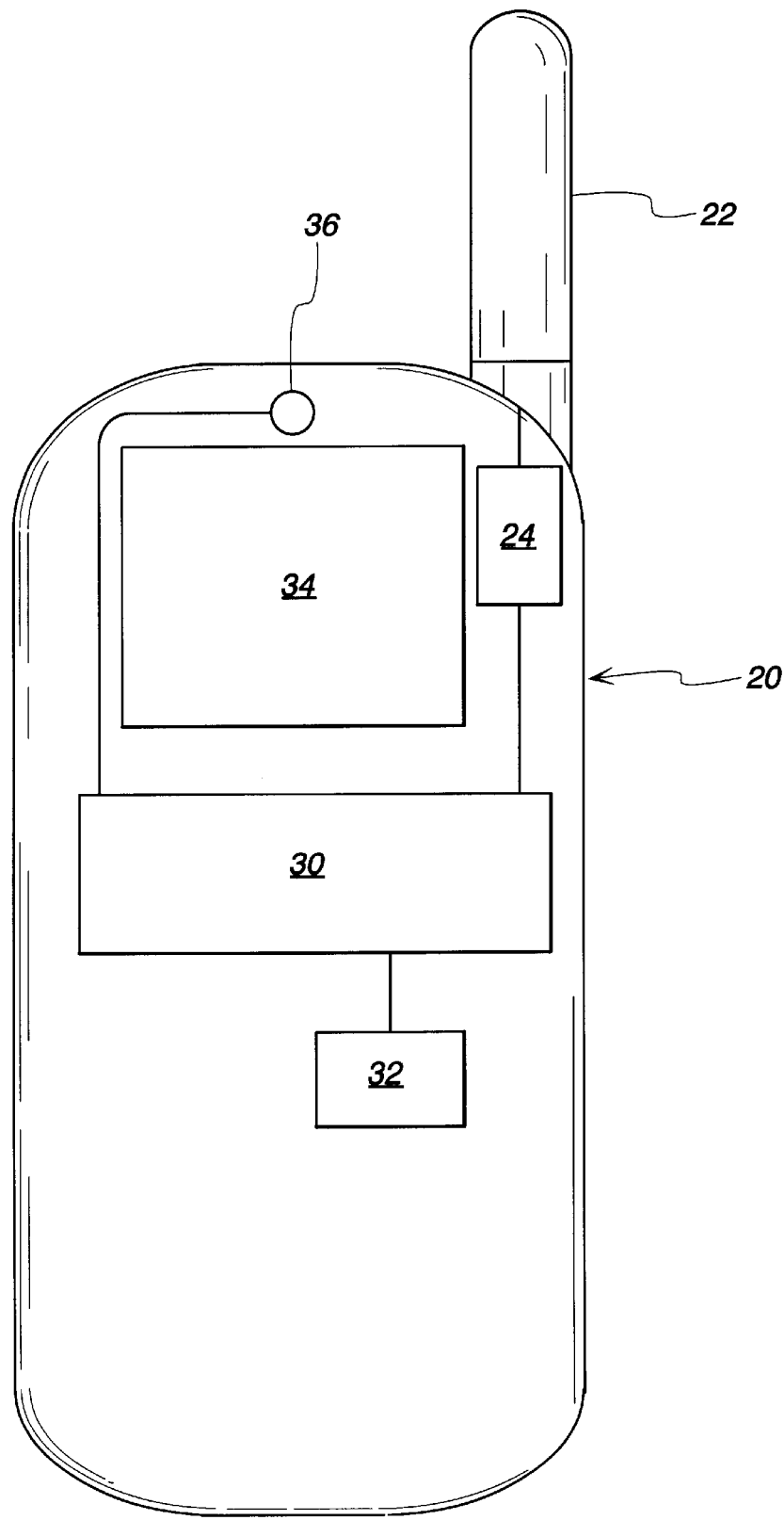
FIG. 1 is a block illustration of a device embodying the present invention.
Figure 2:
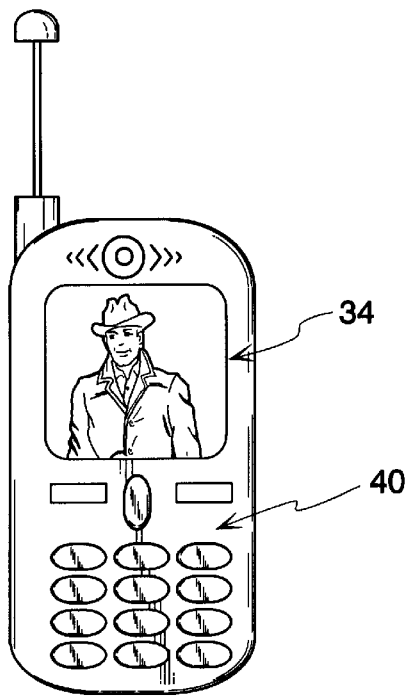
FIG. 2 is a plan view of a telephone according to the present invention.

An exemplary embodiment of the present invention is illustrated in FIGS. 1–2.

As illustrated in the block diagram of FIG. 1, a telephone 20 has a suitable antenna 22 connected to a suitable transceiver 24 for transmitting and receiving RF signals. It should be understood, however, that while the present invention is most advantageously used with portable communication devices such as cordless and cellular telephones, the invention in its broad scope could also be used with wired telephones and other communication devices, including for example desktop computers connected to the Internet.

A processor 30 is suitably connected to the transceiver 24 for generating and receiving suitable signals for transmission and reading. Such operations are not described here as they are well known in the art, although it should be understood that the present invention may be suitably used with a wide variety of communication types (e.g., cellular and land line) and various standards used with such communication types. A suitable memory 32 is also included.

The telephone 20 also includes a video display 34 and a suitable miniature camera 36. In the telephone design illustrated, the camera 36 is preferably near the display 34 as shown so as to be generally directed toward the front of the display 34 where a person viewing the display 34 would typically be located. However, different camera locations could be advantageously used with different telephone designs as will be understood by those skilled in the art. Other components can also be included with the telephone 20, such as a keypad input 40 (see FIG. 2), but are not shown in the Figures for clarity in focusing the disclosure on the present invention.

The camera 36 captures a local picture and sends that signal to the processor 30 for suitable processing and transmission via the transceiver 24 as is known. Typically, the camera 36 will capture local pictures at selected intervals, and transmit a new picture at each such interval. The present invention may be used with virtually any choice of such intervals, whether frequent (so as to transmit a "moving picture") or very infrequent (as may be desired if cellular telephone band widths are not readily available for such transmissions, or if the processor 30 is busy or current usage need be minimized). Similarly, the invention may be used with different intervals to the received picture, where the remote device with which the telephone 20 is communicating chooses the interval between the pictures it sends to the telephone 20.

The processor 30 performs a wide variety of functions for the telephone 20 as is known in the art, and those operations will not be described herein except insofar as the processor 30 is used in accordance with the present invention. In that regard, the processor 30 is connected to the camera 36 for suitable handling of the captured local picture, and is connected to the display 34 for controlling the picture shown on the display 34 as described below.

Figure 3:
FIG. 3 is a local picture taken by the device camera.
Figure 4:
FIG. 4 is a remote picture received by the device.

Specifically, in accordance with the present invention, the telephone camera 36 will capture a local picture 50 (FIG. 3) which will typically be a portrait the person using the telephone 20. This captured local picture 50 is suitably transmitted by the transceiver 24 to the remote device with which it is communicating. The captured local picture 50 is also retained in the processor 30 and memory 32 for further use as described below. A remote picture 60 (FIG. 4) is also received by the transceiver 24, the remote picture 60 typically being a portrait picture of the person using the remote device.

In accordance with the present invention, image recognition software is stored in the memory 32 and is run by the processor 30 to, broadly stated, suitably recognize an element or object in the local picture 50 (e.g., an upper torso portrait of the telephone user). The image recognition software can, for example, recognize motion of objects (a near object such as the person would move differently relative to the background of the picture), and define an outline for such an object (e.g., the user's torso, the outline 66 of the torso in the local picture 50 being shown in FIG. 5), and then orient the object in the local picture 50 relative to the boundary of the picture 50. As another alternative, the image recognition software can detect and abstract a contour which is known to be desired in the picture (for example, the user's head and shoulders).

Image recognition software is known in the art, such as U.S. Pat. No. 5,754,225 (titled "Video Camera System and Automatic Tracking Method Therefor"), U.S. Pat. No. 5,778,099 (titled "Picture Block Motion Detecting Apparatus") and U.S. Pat. No. 5,903,783 (titled "Motion Compensation Device to Control a Centering Operation of a Motion Compensation Lens"), the complete disclosures of which are hereby incorporated by reference. However, it should be understood that the invention in its broadest scope is not to be limited to a particular type of image recognition software (i.e., image recognition does not have to be based on motion such as described in the example given above), nor does it require recognition of particular objects. For example, with telephones the recognized object could be the person's head rather than their torso, or could even be a completely different object entirely (e.g., if images of a page are being sent between the devices, a specific design cursor could be included in each page and the cursors used in mapping the two pictures).

The processor 30 then generates a position indicator 70 which is defined based on the position of the object (or its outline 66) in the local picture 50. A preferred indicator is a boundary or frame 70 about the object. The frame 70 can generally correspond in size to the outer boundary of the entire picture as this will result in minimal visual intrusion by the position indicator 70 on the remote picture 60 also shown on the video display 34 as will be described below, but it does not have to be. For example, the frame could be a small box around the torso head, or rather than a frame could be a different indicator such as an "x" located at a known spot (such as the person's chin or nose) as will be understood.

Figure 5:
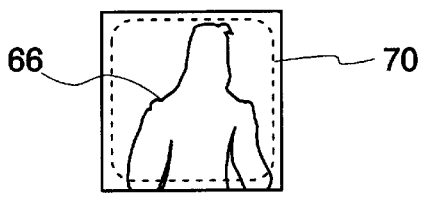
FIG. 5 is an illustration of the FIG. 3 local picture illustrating the recognized object and generated position indicator.
Figure 6:
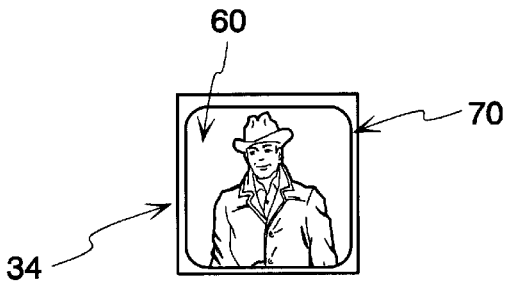
FIG. 6 is a video display illustrating the remote picture with the position indicator from FIG. 5.
Figure 7:
FIG. 7 is an illustration of an off-center local picture illustrating the recognized object and generated position indicator.
Figure 8:
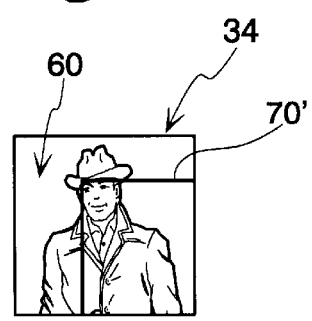
FIG. 8 is a video display illustrating the remote picture with the position indicator from FIG. 7.

The processor 30 causes the video display 34 to display the position indicator 70 from the local picture 50 at the location within the boundary of the video display 34 which corresponds to the location of the position indicator 70 within the boundary of the local picture 50 on the remote picture 60 shown in the display 34. For example, where both of the local pictures 50 has the user properly centered as illustrated in FIG. 5, the indicator 70 is displayed near the outer boundary of the video display 34 as shown in FIG. 6. If the user were centered but far from the camera, the position indicator 70 would be centered on the video display 34 but show as a smaller frame. However, if the recognized object (e.g., the telephone user) is off-center on the local picture 50 as shown in FIG. 7, then the position indicator 70' will be off-center relative to the picture boundary and will be displayed off-center on the video display 34 such as shown in FIG. 8.

It will be appreciated that this invention will enable the received picture 60 to be displayed in the full screen of the video display 34, with the position indicator 70 giving the telephone user a clear indication when the camera 36 is misdirected, such indication being adequate to inform the user of such a situation without intruding unacceptably on the remote picture being displayed.

Figure 9:
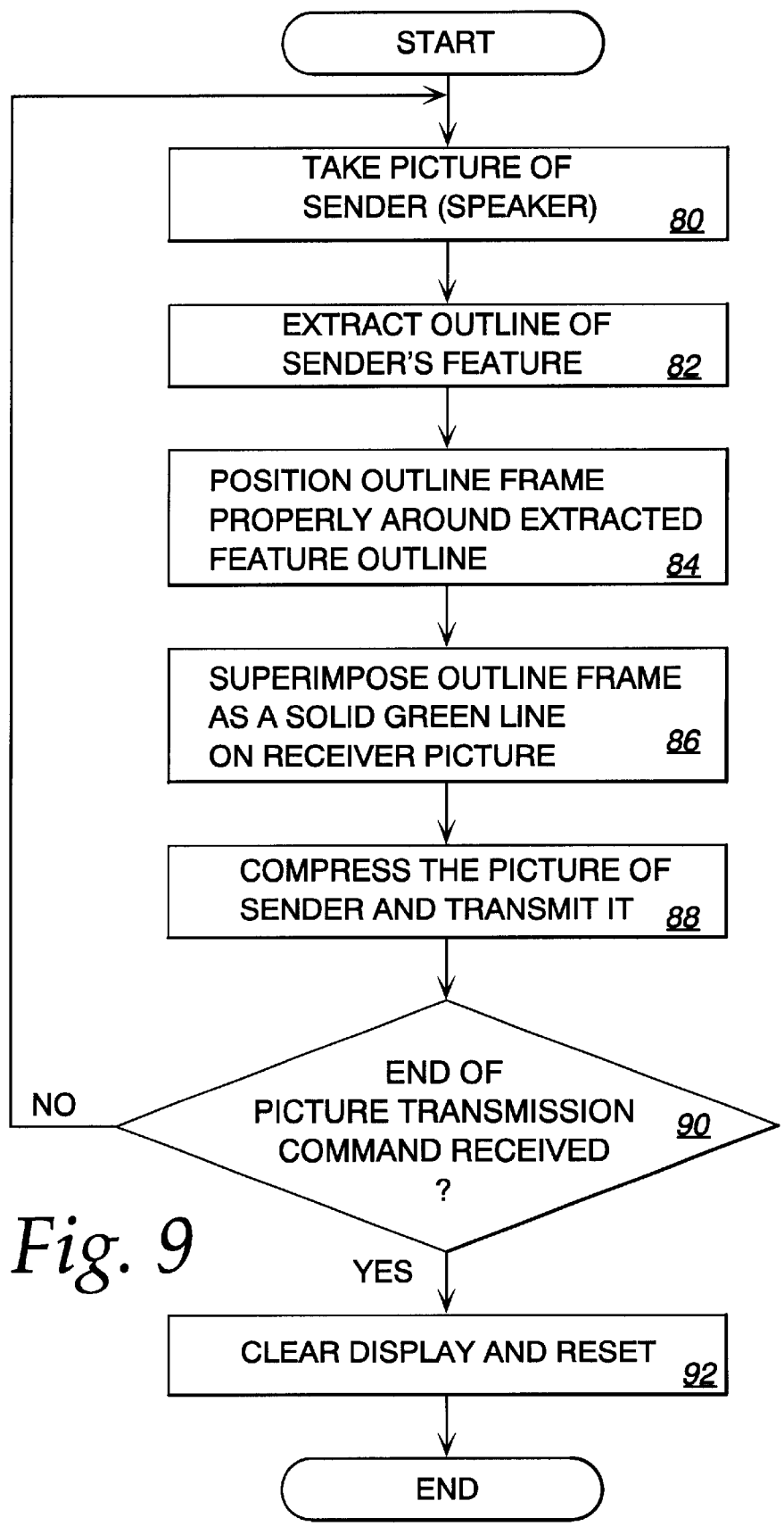
FIG. 9 is a block diagram of the method according of the present invention.

FIG. 9 illustrates a flow chart of the method embodied by the present invention. Upon starting, a picture (local picture 50) is taken of the sender (i.e., the person speaking on the telephone 20) (box 80). An outline 66 of the sender's features is extracted from the picture 50 (box 82), and a frame 70 is positioned around the extracted outline 66 of the features (box 84). The frame 70 is superimposed (e.g., as a solid green line) on the remote picture 60 being shown on the display (box 86). The local picture 50 is also suitably transmitted (typically through use of compression) (box 88). Until a command is received to end the transmission (decision box 90), operation continues to loop through boxes 80–88. When the end of picture transmission command is received, the display is cleared and reset (box 92). It should be recognized, however, that the end of picture transmission command could be generated during the middle of a communication and the display not cleared until the end of the communication (for example, the user could check to see that the position indicator 70 shows that a good picture has been transmitted and then end further picture transmission, so that the other party to the communication would have that "good" picture frozen as a still picture on his display.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. A communication device, comprising:
   a camera adapted to capture a picture;
   a transceiver adapted to receive a picture from a remote device and to transmit the picture captured by the camera;
   a processor adapted to recognize an object in the local picture and generate a position indicator of said object, said position indicator corresponding to a frame around said captured picture object; and
   a video display having a selected portion substantially the entirety of which is adapted to display both the received remote picture and at least a part of the position indicator frame, wherein said position indicator frame is substantially of a size corresponding to said video display selected portion and said at least part of the position indicator frame displayed on said video display corresponds to the part of said frame oriented on said captured picture.

2. The communication device of claim 1, wherein:
   the captured picture object has a known contour; and
   the processor is adapted to recognize the object by recognizing said known contour in the captured picture and to orient said frame outside said contour.

3. A communication device, comprising:
   a camera adapted to capture a picture;
   a transceiver adapted to receive a picture from a remote device and to transmit the picture captured by the camera;
   a processor adapted to recognize an object in the local picture and generate a position indicator of said object, said object having a size and said position indicator corresponding to a frame substantially centered on said captured picture object and sized to correspond to said object size; and
   a video display adapted to display both the received remote picture and at least a part of the position indicator frame associated with said captured picture were said captured picture displayed on said video display.

4. The communication device of claim 3, wherein:
   the captured picture object has a known contour; and
   the processor is adapted to recognize the object by recognizing said known contour in the captured picture and to orient said frame at a selected orientation around said contour.

5. The communication device of claim 3, wherein said frame size is proportionate to the size of the captured picture object relative to the video display.

6. A method of indicating the proper orientation of a local camera in a two way video communication involving a received remote picture and a transmitted local picture, said pictures having boundaries, comprising the steps of:
   displaying the remote picture on substantially the entirety of a selected portion of a local video display;
   recognizing an object in the local camera picture; and
   displaying a position indicator on the video display corresponding to the position of said object within the boundary of the local picture, said position indicator corresponding to a frame around said object and said frame substantially corresponding to the size of the selected portion of said local video display wherein only that part of the position indicator frame which corresponds to the part of said frame oriented on said captured picture is displayed on said video display.

7. The method of claim 6, wherein:
   the captured picture object has a known contour;
   the object is recognized by recognizing said known contour in the captured picture; and
   said frame is at a selected orientation around said contour.

8. A method of indicating the proper orientation of a local camera in a two way video communication involving a received remote picture and a transmitted local picture, said pictures having boundaries, comprising the steps of:
   displaying the remote picture on substantially the entirety of a selected portion of a local video display;
   recognizing a selected object having a size in the local camera picture;
   generating a position indicator corresponding to a frame around said object, said frame substantially corresponding to the size of the selected portion of said local video display;
   displaying said position indicator on the video display corresponding to the position of said object within the boundary of the local picture, wherein said frame substantially corresponds to the size of the selected portion of said local video display and only that part of the position indicator frame which corresponds to the part of said frame oriented on said captured picture is displayed on said video display.

9. The method of claim 8, wherein:
   the captured picture object has a known contour;
   the object is recognized by recognizing said known contour in the captured picture; and
   said frame is at a selected orientation around said contour.

10. The method of claim 8, wherein said frame size is proportionate to the size of the captured picture object relative to the video display.

* * * * *